(12) United States Patent
Oshikiri et al.

(10) Patent No.: US 7,920,773 B2
(45) Date of Patent: Apr. 5, 2011

(54) VIDEO REPRODUCING DEVICE

(75) Inventors: Masato Oshikiri, Tokyo (JP); Haruki Takata, Yokohama (JP); Akira Kitazume, Fujisawa (JP); Takehiro Uzawa, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 1303 days.

(21) Appl. No.: 11/482,831

(22) Filed: Jul. 10, 2006

(65) Prior Publication Data

US 2007/0031115 A1   Feb. 8, 2007

(30) Foreign Application Priority Data

Aug. 8, 2005   (JP) ................. 2005-229014

(51) Int. Cl.
*H04N 9/80* (2006.01)
*H04N 5/76* (2006.01)
*H04N 5/93* (2006.01)
*H04N 5/917* (2006.01)
*H04N 7/18* (2006.01)
*H04N 9/68* (2006.01)
*G06F 3/00* (2006.01)
*G09G 3/32* (2006.01)
*G09G 5/00* (2006.01)
*G09G 5/02* (2006.01)
*G11B 21/08* (2006.01)

(52) U.S. Cl. ........ 386/247; 386/285; 386/286; 386/328; 386/331; 345/1.3; 345/82; 345/600; 348/149; 348/231.9; 348/234; 369/30.03; 715/723

(58) Field of Classification Search ............ 386/95, 386/46, 69, 96, 126, E5.001, E5.024, E5.064, 386/E5.072, E9.013, E9.04; 348/149, 231.9, 348/234, E5.002, E5.007, E7.061, E7.069, 348/E7.087; 369/30.03; 707/E17.028; 715/723; G9B/20.009, 20.14, 27.012, 27.019, 27.029, 27.047, 27.05, 27.051
See application file for complete search history.

(56) References Cited

U.S. PATENT DOCUMENTS

| 4,593,414 | A | * | 6/1986 | Koyanagi ................. 455/186.2 |
| 6,594,442 | B1 | * | 7/2003 | Kageyama et al. ............ 386/96 |
| 6,734,904 | B1 | * | 5/2004 | Boon et al. ................ 348/234 |
| 7,091,927 | B1 | * | 8/2006 | Hagge et al. ............... 345/1.3 |
| 2002/0037159 | A1 | * | 3/2002 | Goto et al. ................. 386/69 |
| 2002/0080276 | A1 | | 6/2002 | Mori et al. |
| 2002/0126135 | A1 | * | 9/2002 | Ball et al. .................. 345/600 |
| 2003/0154185 | A1 | | 8/2003 | Suzuki et al. |
| 2004/0128317 | A1 | * | 7/2004 | Sull et al. ................. 707/104.1 |
| 2004/0213092 | A1 | * | 10/2004 | Ueda et al. ............... 369/30.03 |

(Continued)

FOREIGN PATENT DOCUMENTS

JP   06-119402   4/1994

(Continued)

*Primary Examiner* — Thai Tran
*Assistant Examiner* — Syed Y Hasan
(74) *Attorney, Agent, or Firm* — Antonelli, Terry, Stout & Kraus, LLP.

(57) ABSTRACT

The present invention provides a video reproducing device which provides a function of reproducing a still image file and a moving image file recorded onto a recording medium in plural formats so that a user can easily identify a matched statuses of the files in the video reproducing device and can select and operate a target file as well as a control method therefor. The present invention displays an index screen in which thumbnails of a still image file and a moving image file in plural formats read from a recording medium are arrayed and further displays icons for clarifying a match relation between the video reproducing device and the files.

9 Claims, 10 Drawing Sheets

U.S. PATENT DOCUMENTS

| | | |
|---|---|---|
| 2006/0001771 A1 | 1/2006 | Hayakawa |
| 2006/0023083 A1* | 2/2006 | Yoo .......... 348/231.99 |

FOREIGN PATENT DOCUMENTS

| | | |
|---|---|---|
| JP | 08-147952 | 6/1996 |
| JP | 10-161837 | 6/1998 |
| JP | 10-164484 | 6/1998 |
| JP | 11-134157 | 5/1999 |
| JP | 11259506 A * | 9/1999 |
| JP | 2000-148775 | 5/2000 |
| JP | 2000-222417 | 8/2000 |
| JP | 2001-359039 | 12/2001 |
| JP | 2002-158948 | 5/2002 |
| JP | 2002-170364 | 6/2002 |
| JP | 2003-018495 | 1/2003 |
| JP | 2003-069940 | 3/2003 |
| JP | 2003-208343 | 7/2003 |
| JP | 2004-064761 | 2/2004 |
| JP | 2004-215281 | 7/2004 |
| JP | 2005-070858 | 3/2005 |
| WO | WO 2005/027509 | 3/2005 |

* cited by examiner

FIG. 4A
STILL IMAGES
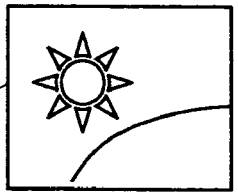
103
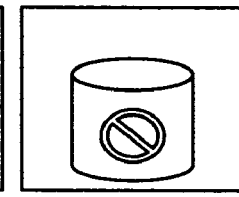
104
FIG. 4B
(2-1)
DECODABLE FILE
FORMAT
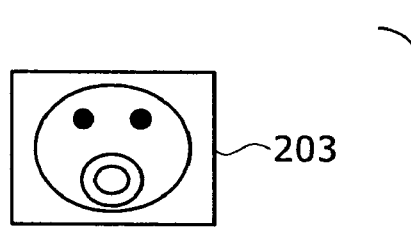
203
(2-2)
VIDEO-DECODABLE
FORMAT WITHOUT
AUDIO
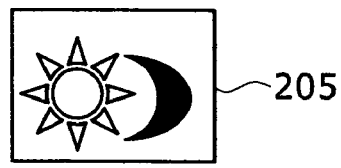
205
(2-3)
AUDIO-UNDECODABLE
FILE FORMAT
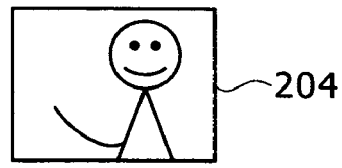
204
(2-4)
UNDECODABLE FILE
FORMAT
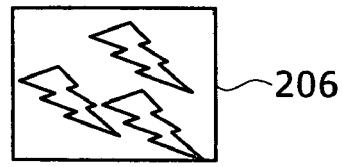
206
(2-5)
UNASSUMED FILE
FORMAT
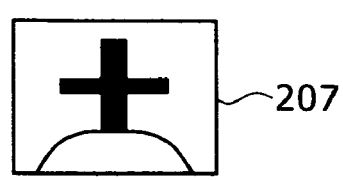
207
MOVING IMAGES

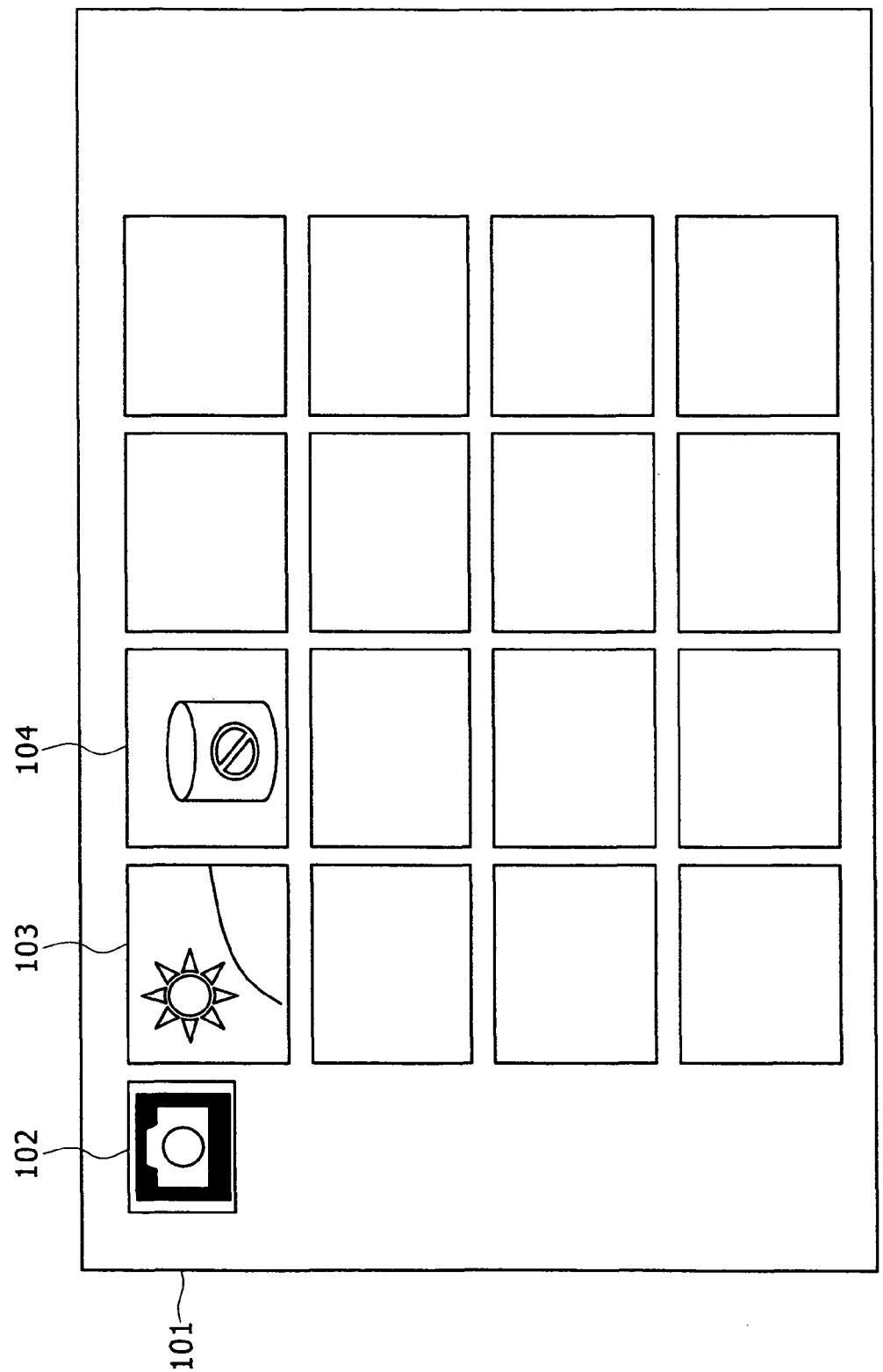

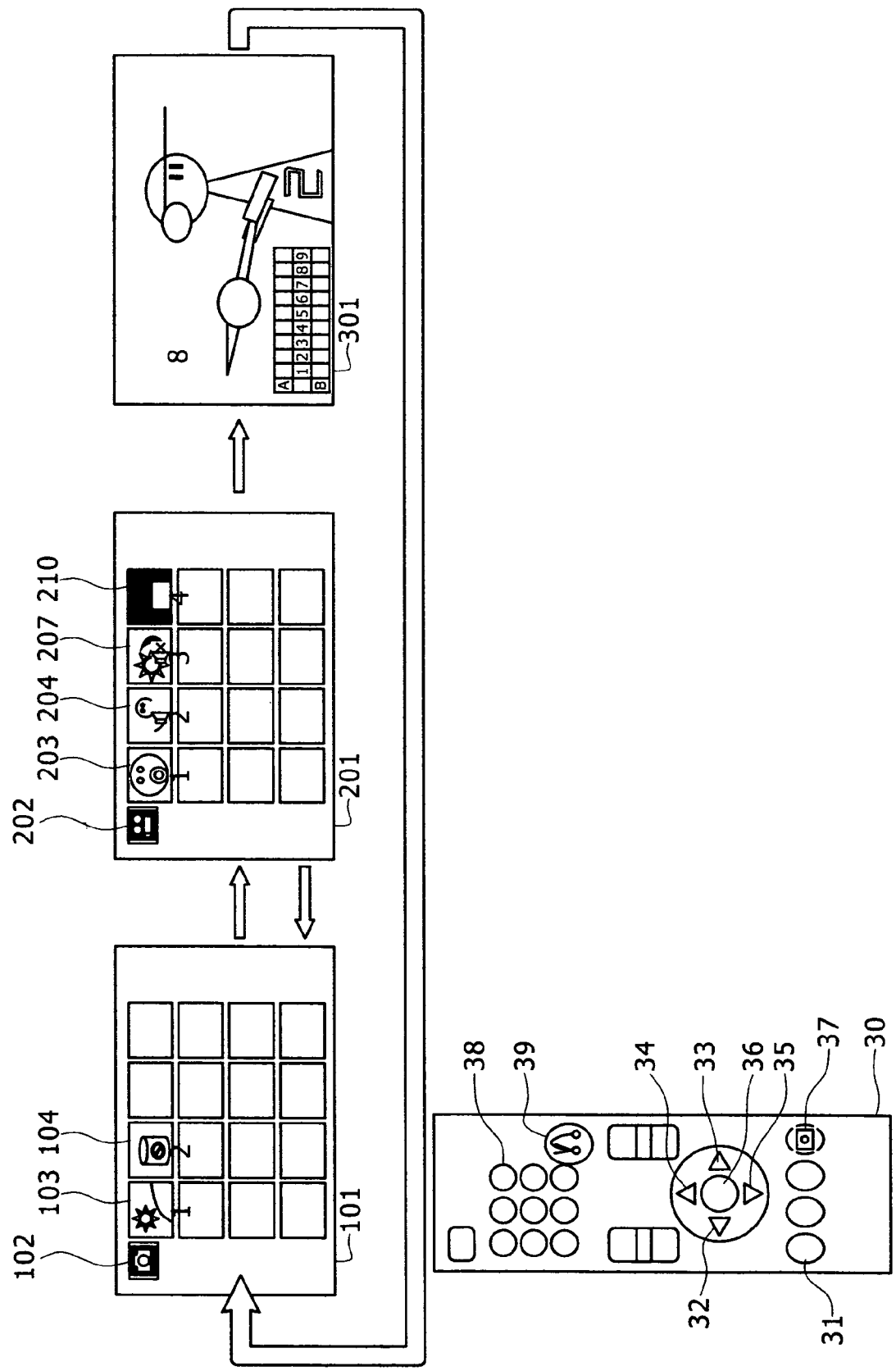

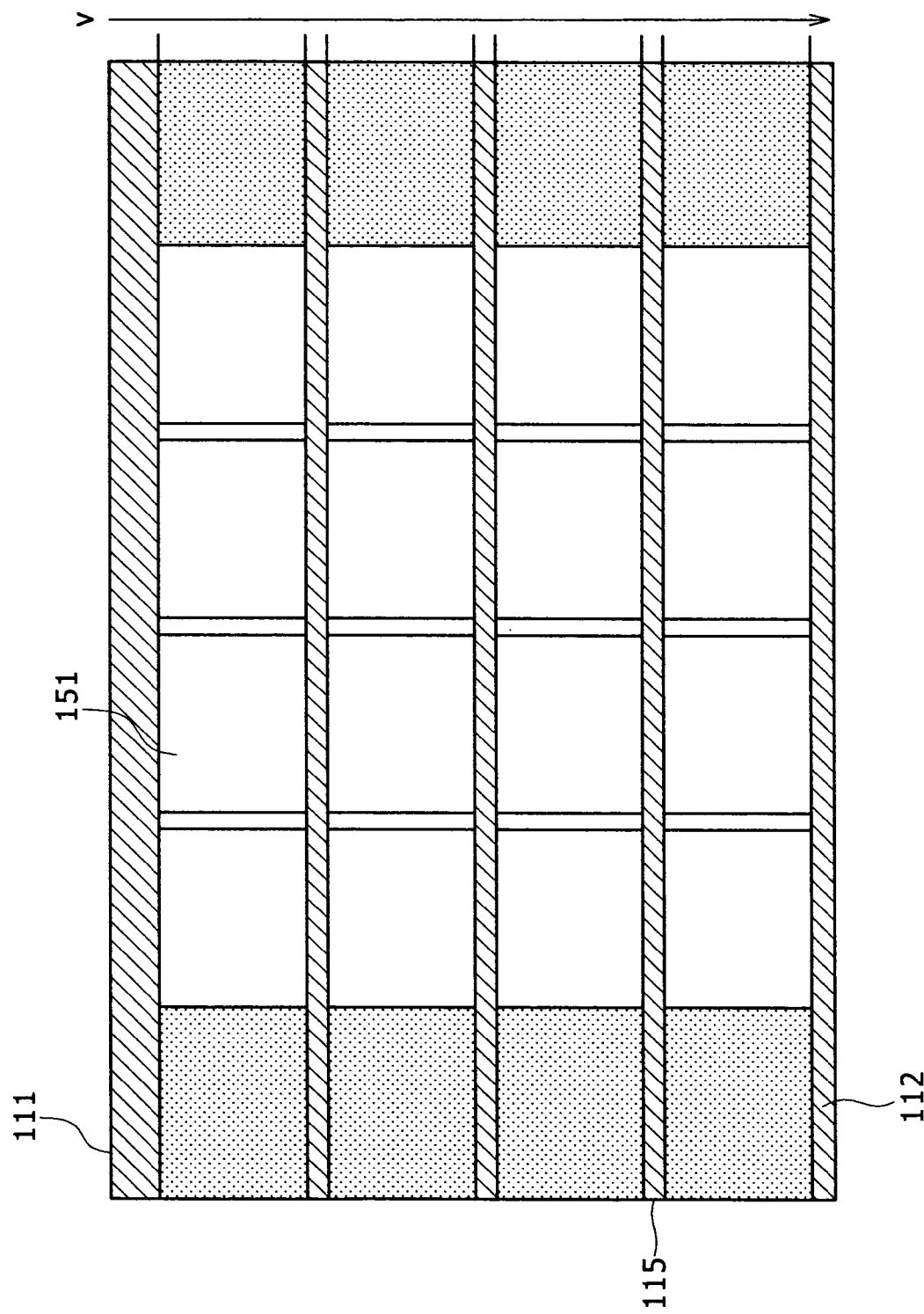

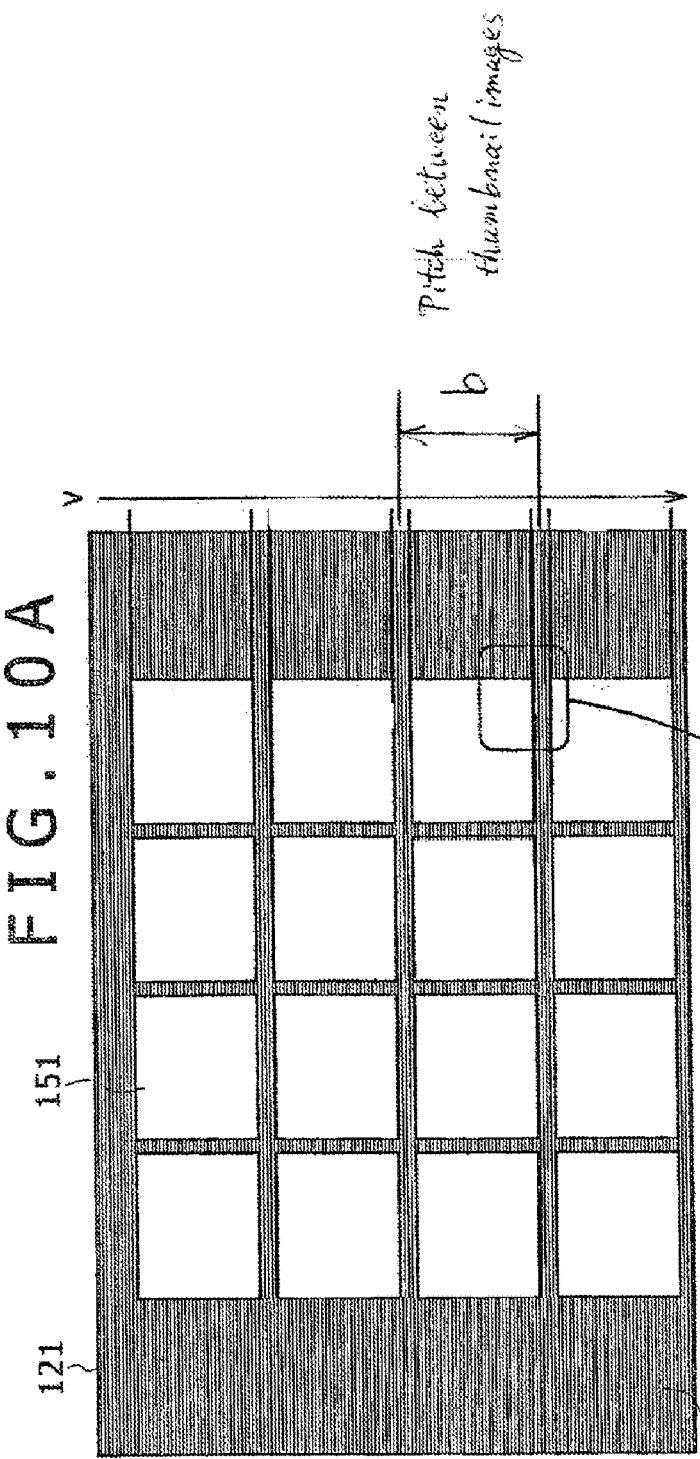
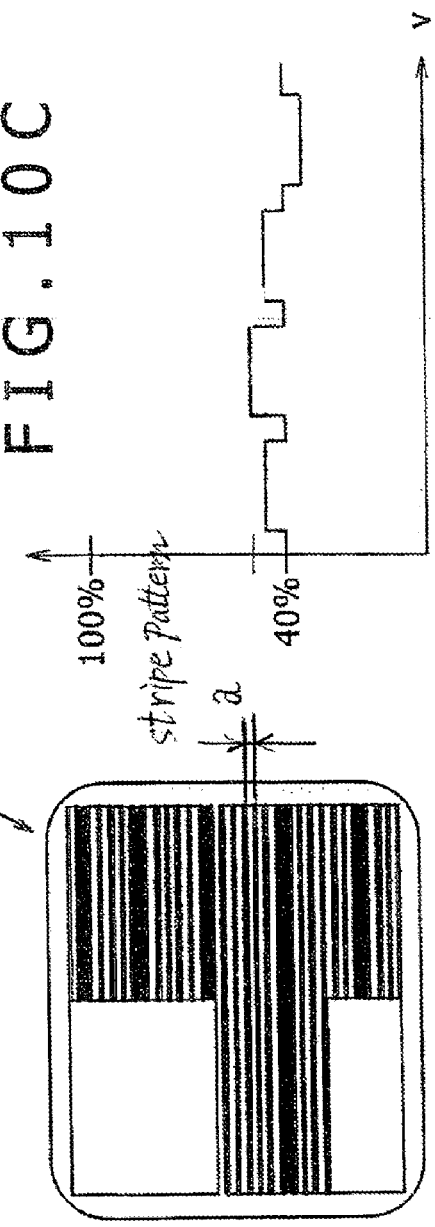

VIDEO REPRODUCING DEVICE

CLAIM OF PRIORITY

The present application claims priority from Japanese application serial no. JP 2005-229014, filed on Aug. 8, 2005, the content of which is hereby incorporated by reference into this application.

BACKGROUND OF THE INVENTION (1) Field of the Invention

The present invention relates to a video reproducing device which can reproduce and display a still image file and/or a moving image file recorded onto a removable recording medium such as a memory card.

(2) Description of the Related Art

There exists a video reproducing device having the function of reproducing a still image file and/or a moving image file recorded onto a removable recording medium. The moving image/still image file is recorded onto the recording medium in various formats (such as JPEG and MPEG) by a recording device such as a digital still camera or a PC. For instance, JP-A Nos. 2005-70858 and 2004-215281 disclose a technique of displaying on a screen that the format reproducible by a video reproducing device is not matched with the format of a moving image/still image file (hereinafter, called an image file) recorded onto a recording medium.

SUMMARY OF THE INVENTION

An image file, in particular, a moving image file is often in a video format and an audio format. A video reproducing device can be matched with any one of the formats. The above Patent References have not considered such a case. When one of the video format and the audio format of the moving image file is not matched with the format on the device side, they are both invalid and the detailed matched status cannot be clarified. When one of the video format and the audio format is matched with the format on the device side, neither may be reproduced.

In addition, the above Patent References cannot easily switch a moving image/still image file index screen and a video other than that, such as a television video. Further, the index screen cannot be viewed more easily.

The present invention has been made in view of the above circumstances. An object of the present invention is to provide a technique which can satisfactorily reproduce moving images and audio when audio data is added to an image file. Another object of the present invention is to provide a technique which can easily switch a moving image/still image file index screen and a video other than that. A further object of the present invention is to provide a technique which can display an index screen which can be viewed more easily.

In a first configuration of the present invention, information indicating whether or not audio can be reproduced together with a still image file and/or a moving image file is added to the thumbnail image to be displayed. When the format of a still image file and/or a moving image file cannot be matched with a video reproducing unit, in place of the thumbnail image, an icon indicating that the still image file and/or the moving image file cannot be reproduced may be displayed.

In a second configuration of the present invention, a remote controller for operating the video reproducing device is provided with a switch operation unit, a first index screen displaying plural still image thumbnails, a second index screen displaying plural moving image thumbnails, and a normal video (e.g., television video) can be sequentially switched by continuously operating the switch operation unit of the remote controller. The switch operation unit may be a single switch button only for the sequential switch.

In a third configuration of the present invention, a background image of the first index screen displaying plural still image thumbnails or a background image of the second index screen displaying plural moving image thumbnails includes a horizontal stripe pattern narrower than a pitch between thumbnail images in a vertical direction. The average brightness level of the background image including the horizontal stripe pattern may be controlled in accordance with the average brightness level of the thumbnail images displayed on the first or second index screen. The average brightness level of the background image including the stripe horizontal pattern may be about 40%.

According to the first configuration of the present invention, when any one of the video and audio formats of the moving image file is not matched with the format on the device side, the matched status is clarified to reproduce the matched video or audio format.

According to the second configuration of the present invention, the first index screen, the second index screen, and the normal video can be sequentially switched by a single operation. The operation switching these is easy.

According to the third configuration of the present invention, the horizontal stripes in displaying plural thumbnail images are less noticeable. The index screen can be viewed more easily.

BRIEF DESCRIPTION OF THE DRAWINGS

FIGS. 4A and 4B are diagrams of types of file formats stored in a recording medium according to Embodiment 1;

FIG. 5 is a still image index screen according to Embodiment 1;

FIG. 7 is a diagram showing a method of switching the still image index screen, the moving image index screen, and a last channel screen according to Embodiment 2;

FIG. 9 is a diagram of how the index screen is actually viewed in the related art; and FIGS. 10A to 10C are diagrams showing an index screen and change in brightness of a screen vertical direction according to Embodiment 3.

DETAILED DESCRIPTION OF THE EMBODIMENT

Embodiments of the present invention will be described below in detail with reference to the drawings.

A recording medium related to a video reproducing device according to this embodiment includes a memory card equipped with a removable flash memory, an optical disc (CD-R, CD-RW, DVD-RAM, DVD±R, or DVD±RW), and a memory card reader or a removable HDD connected via a USB interface or an IEEE1394 interface in conformity with the IEEE1394 specification (that is, DV terminal). A moving image file and a still image file can be recorded onto the recording medium and can be reproduced by a recording device such as a digital camera or a personal computer.

The video reproducing device according to this embodiment incorporates an interface unit for accessing a memory card interface, a USB interface, and a recording medium such as an optical disc drive such as a CD or DVD. The interface unit directly controls a file recorded onto the recording medium. The video reproducing device according to this embodiment may be incorporated into a television receiver such as a PDPTV, LCDTV, or projection TV or may be integral with the television receiver. The video reproducing device according to this embodiment may have an input unit to which a video signal generated by an external recording and reproducing device such as a DVD player is inputted, other than the interface unit.

In the description of this embodiment, an interface connected to a recording device such as a digital camera is the USB interface. This embodiment is not limited to this. As described above, the IEEE1394 interface may be connected to the recording device.

Embodiment 1

Figure 1:
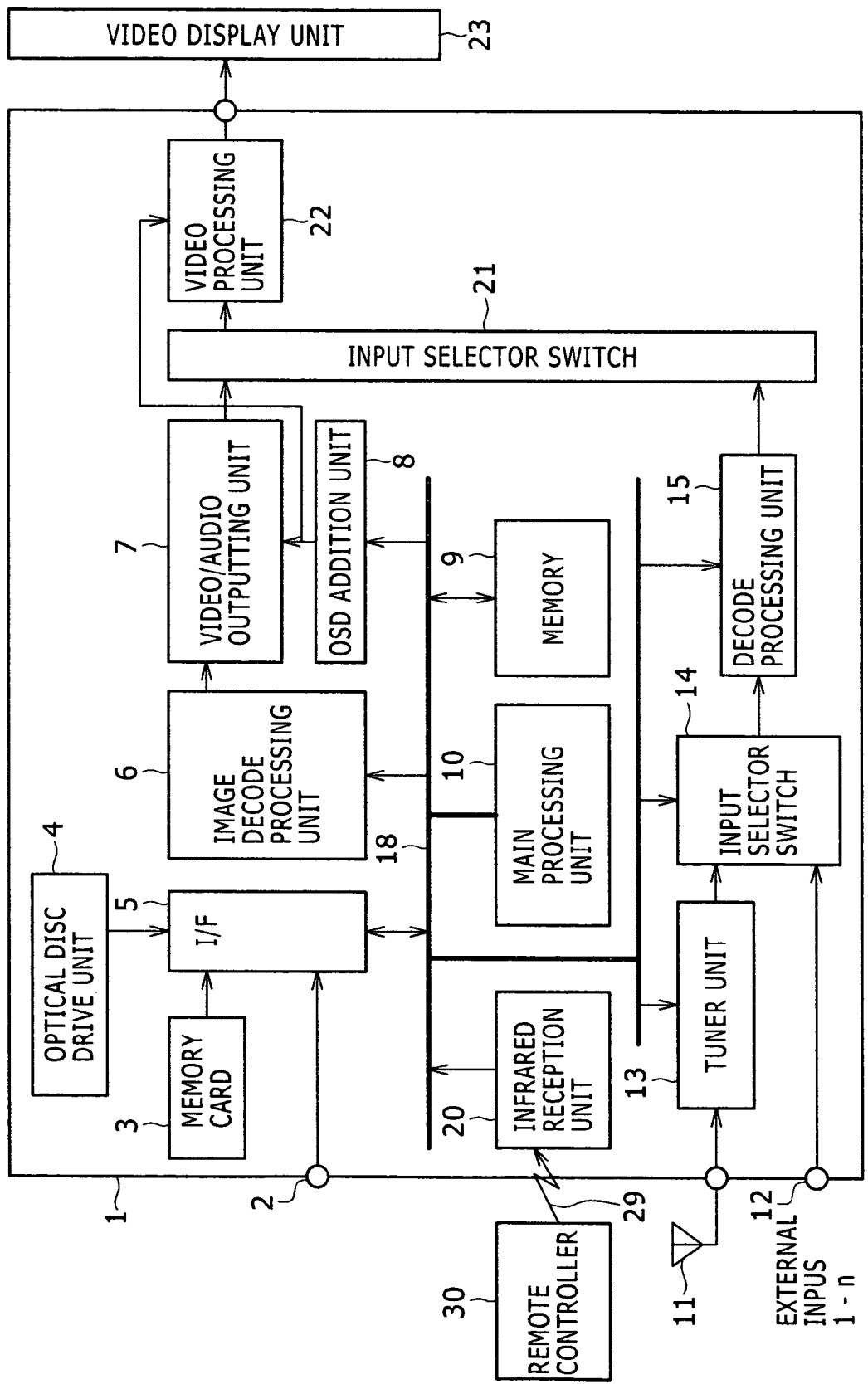
FIG. 1 is a basic block diagram of a video reproducing device according to Embodiment 1.

FIG. 1 is a schematic block diagram showing one configuration example of a video reproducing device according to Embodiment 1. In FIG. 1, a video reproducing device 1 is operated by a remote control signal 29 transmitted from a remote controller 30 using infrared rays. An infrared reception unit 20 which receives the remote control signal 29 converts it to an electric signal to output it via a bus line 18 to a main processing unit 10. The main processing unit 10 is an arithmetic controller including a CPU (Central Processing Unit) and controls components configuring the video reproducing device 1 as necessary in accordance with a program stored in a memory, not shown, based on the received remote control signal for performing predetermined processing.

The video reproducing device 1 has a USB input terminal 2, the mounting mechanism of a memory card 3, not shown, and an optical disc drive unit 4, to which image data recorded by an external recording device (e.g., a digital video camera or a digital camera), not shown, is inputted. The block configuration of these reproducing functions will be described. Image data from the USB input terminal 2, image data recorded onto the memory card, and image data recorded onto an optical disc are structured for each file. Hereinafter, the image data will be simply called an "image file". The USB input is also an image file recorded onto the recording medium. Hereinafter, for convenience, the USB input, the memory card, the optical disc will be called a "recording medium".

An interface unit (hereinafter, abbreviated as an "I/F unit") 5 includes a memory interface as a first interface unit, a USB interface as a second interface unit, and an interface of the optical disc drive unit 4 as a third interface unit. The I/F unit 5 stores an image file read from the memory card 3 or the optical disc drive unit 4 and an image file inputted from the USB input terminal 2 in a memory 9 via the bus line 18.

In this embodiment, the image file from the last mounted recording medium of the USB, the memory card, and the optical disc is selected. This causes no trouble since, typically, the recording media are not mounted at the same time. The optical disc includes AV software. For simplifying the description, the AV software is not particularly considered.

The main processing unit 10 has the function of analyzing the format of the image file stored in the memory 9 to judge whether or not it is matched with the format reproducible by the video reproducing device 1 or can be decoded. The format of the image file includes JPEG, MPEG1, MotionJpeg, and MPEG4. Based on the judged result, the main processing unit 10 controls an image decode processing unit 6 and an OSD addition unit 8 to perform index display as listing display of thumbnail images (the detail will be described later).

The image decode processing unit 6 performs decode processing of the image file under control of the main processing unit 10 and creates thumbnail images for performing listing display (index display) of plural image files recorded onto, e.g., the memory card 3. By an instruction from the main processing unit 10, an index screen as a listing display screen of the thumbnail images is created. As described later, the index screen includes a first index screen showing a listing of plural thumbnail images matched with still image files, and a second index screen showing a listing of plural thumbnail images matched with moving image files. In the case of a moving image file, a representative one among moving images is selected to be a thumbnail image. A technique selecting representative images has been known and the detailed description is omitted.

The OSD addition unit 8 generates a predetermined icon image or character information added to a reproduced image under control of the main processing unit 10.

A video/audio outputting unit 7 generates a video signal of Y, Cb, or Cr and an audio signal from a digital decode signal decoded by the image decode processing unit 6. The icon image from the OSD addition unit 8 is superimposed on the video signal to create an index screen.

The video/audio signal outputted from the video/audio outputting unit 7 is supplied to a video processing unit 22 via an input selector switch 21.

The video processing unit 22 performs predetermined video processing for display in a video display unit 23 and superimposes the icon image or character information from the OSD addition unit 8 on the video/audio signal for output to the video display unit 23.

The video reproducing device has a TV broadcast reception function and plural external inputs such as VCRs. The block configuration of this part will be described. In FIG. 1, for simplifying the drawing, one external input line is shown. Needless to say, plural external input lines are used.

Predetermined one of television broadcast signals received by an antenna 11 is selected by a tuner unit 13 under control of the main processing unit 10 based on user operation using the remote controller 30. The selected broadcast signal is decoded to be outputted to an input selector switch 14. The input selector switch 14 switches an input from the tuner unit 13 and plural external inputs from external input terminals 12 for output to a decode processing unit 15. The decode processing unit 15 converts the inputted video signal to a video signal such as Y, Cb, or Cr for output to the input selector switch 21. The input selector switch 21 switches the input from the decode processing unit 15 and the input from the video/audio outputting unit 7 for output to the video processing unit 22.

Figure 2:
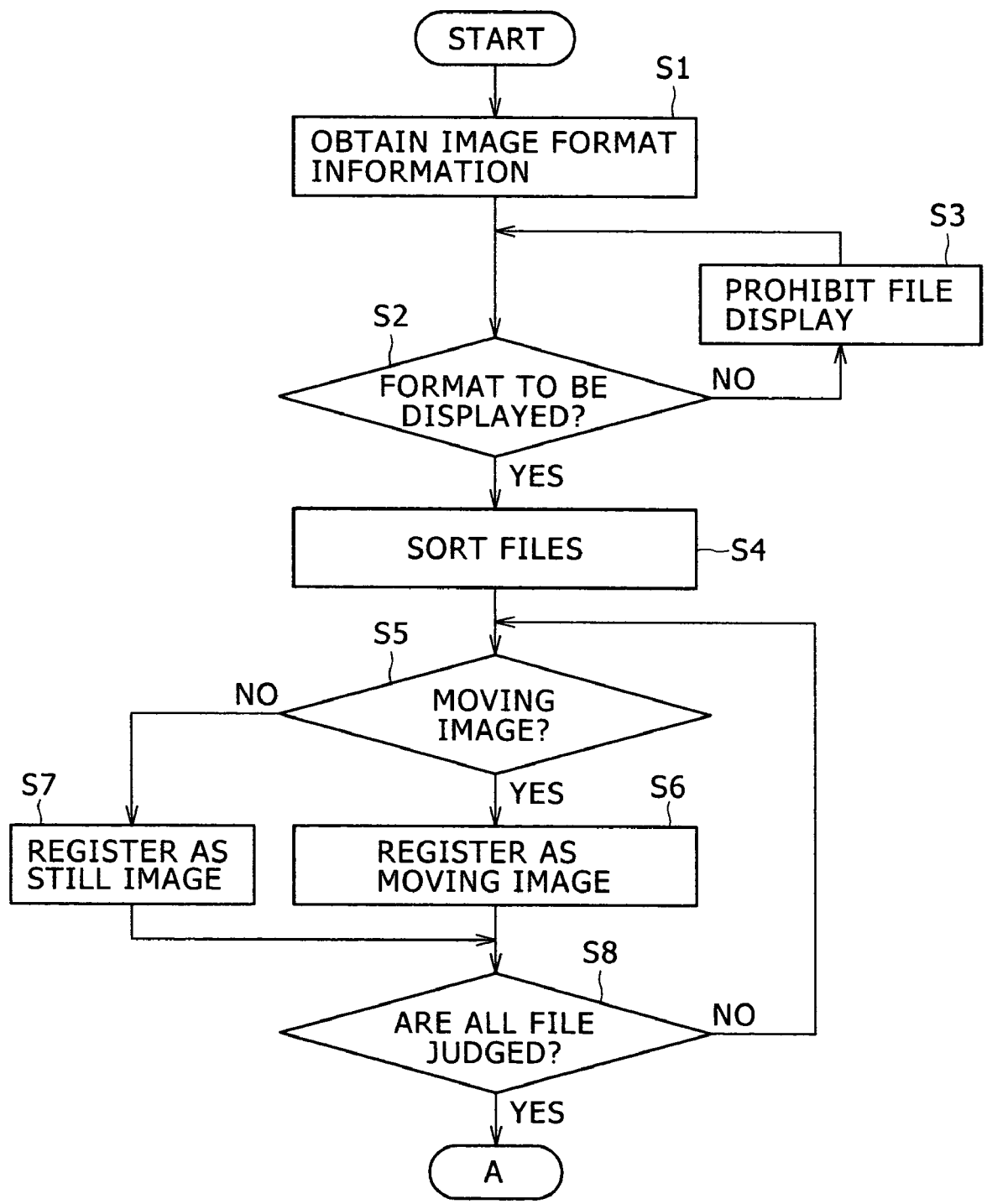
FIG. 2 is a diagram showing a first flow of index display processing according to Embodiment 1.
Figure 3:
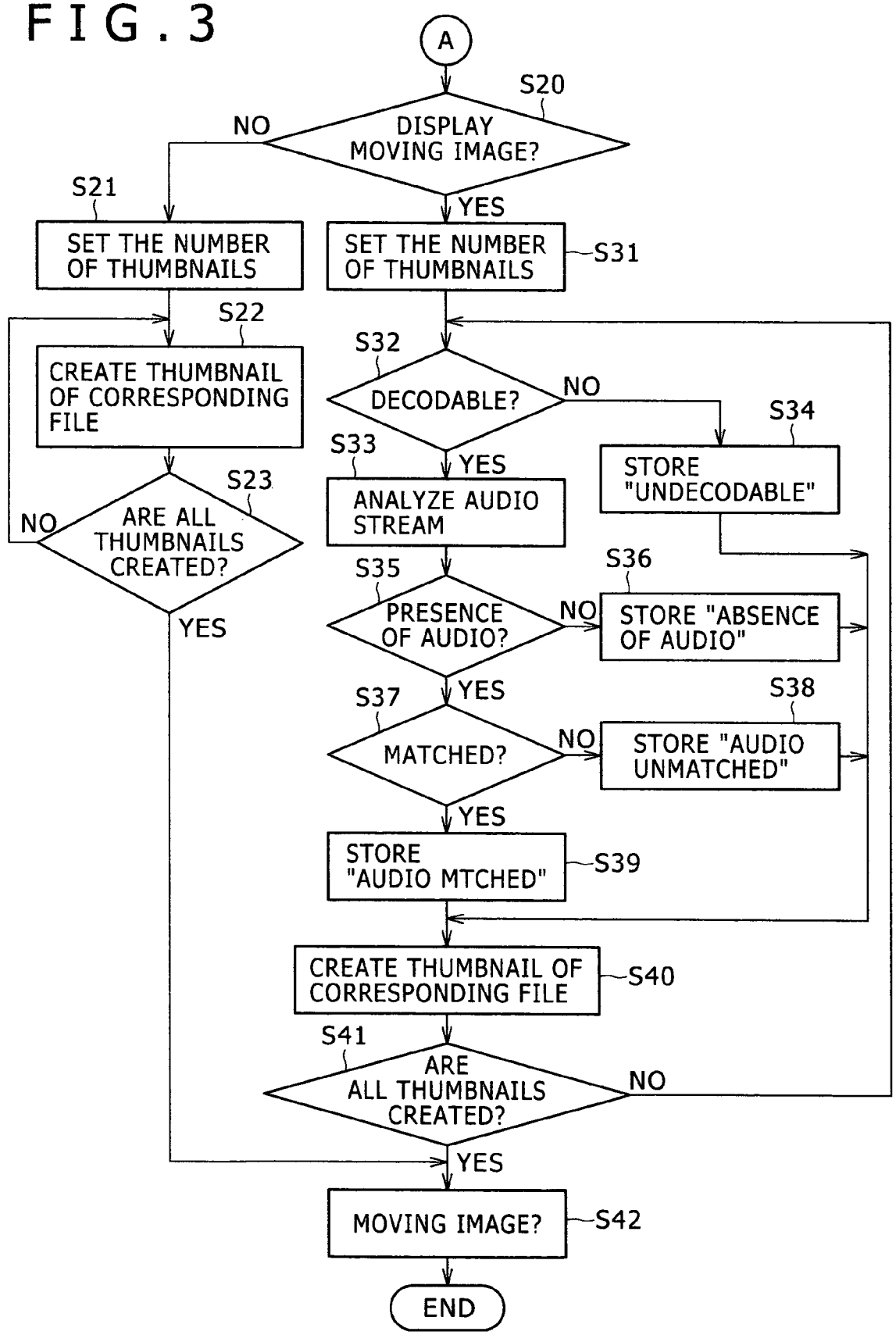
FIG. 3 is a diagram showing a second flow of index display processing according to Embodiment 1.
Figure 6:
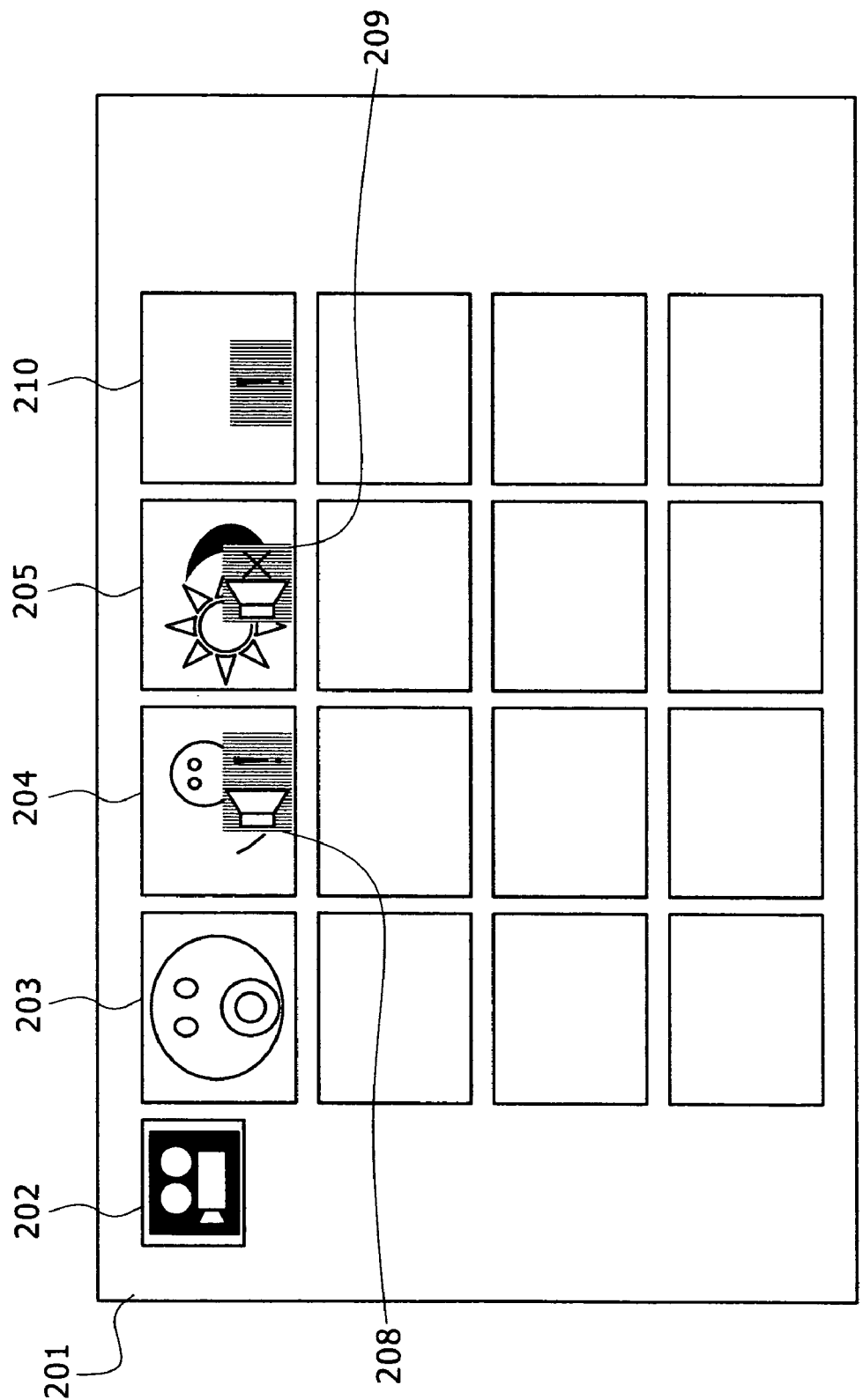
FIG. 6 is a moving image index screen according to Embodiment 1.

The index display processing of the image file recorded onto the recording medium, as the feature of this embodiment, will be described below using FIGS. 2 to 6. FIGS. 2 and 3 are diagrams showing flows of the index display processing according to this embodiment. FIGS. 4A and 4B are diagrams of assistance in explaining classification of formats of image files according to this embodiment. FIG. 5 shows a still image index screen as a first index screen according to this embodiment. FIG. 6 shows a moving image index screen as a second index screen according to this embodiment.

Classification of formats of image files will be described in FIGS. 4A and 4B.

There are a still image file and a moving image file. Typically, for index display (thumbnail display), a still image index screen and a moving image index screen are separately displayed or an index screen in which still images and moving images are mixed is displayed. In this embodiment, index screens in the former configuration are used. Index screens in such configuration will be described below. Most files typically have extensions which can identify their forms (formats). The image files are broadly classified as a still image file or a moving image file using their extensions. In this embodiment, JPG is assumed as a still image extension, and AVI, MOV, MPG, ASF, and MP4 are assumed as moving image extensions. This embodiment is not limited to this and may include other extensions.

There are a moving image including audio and a moving image not including audio. The presence or absence of audio need to be judged. File data is analyzed to judge the presence or absence of audio based on header information or on whether or not the data includes a portion corresponding to audio.

In FIG. 4A, the reference numerals 103 and 104 denote thumbnail images for still image files. In this embodiment, a still image file with JPEG of the extension JPG is assumed. A still image file recorded by a digital camera can be typically decoded. For simplifying the description, the still image file with JPEG can be decoded.

FIG. 4B shows classification of moving image files. The moving image files include an image file of moving image data and an audio file of audio data and can be classified into five categories according to combinations of formats of the files. As shown in FIG. 4B(2-1), the first is a format which can display and decode both a video and audio by the video reproducing device. A thumbnail image in this case is indicated by the reference numeral 203. As shown in FIG. 4B(2-2), the second is a video-decodable format without audio. A thumbnail image in this case is indicated by the reference numeral 205. As shown in FIG. 4B(2-3), the third is an audio-undecodable format. A thumbnail image in this case is indicated by the reference numeral 204. As shown in FIG. 4B(2-4), the fourth is a format which cannot decode a video by the video reproducing device. A thumbnail image in this case is indicated by the reference numeral 206. As shown in FIG. 4B(2-5), the fifth is a format which is not assumed by the video reproducing device. A thumbnail image in this case is indicated by the reference numeral 207. In this embodiment, thumbnail display is not done.

In this embodiment, in the classification (2-4), no video can be decoded. In further classification, the fourth format can decode audio or cannot decode audio. Here, a video need to be reproduced and this embodiment is shown in such manner. Of course, the fourth format may be classified in more detail.

The index display processing using the classification methods will be described using the flows of FIGS. 2 and 3 with reference to FIGS. 1, 4A and 4B, 5, and 6. For simplifying the description, the number of displayable still image files and the number of displayable moving image files are 16 or below as shown in FIGS. 5 and 6, respectively. This embodiment is not limited to this.

In FIG. 2, when the memory card 3 is mounted on the mounting mechanism, not shown, by user operation, the main processing unit 10 sequentially reads image files recorded onto the memory card 3 using the memory 9 via the I/F unit 5 therefrom. The thumbnail display processing and the index screen generation processing are started from the read image files. When the index display processing is started, the extensions of the image files are obtained in step (hereinafter, abbreviated as "S") 1. In S2, all image files are judged whether they are in an assumed file format. When there is any image file in the case of No, display of the image file is prohibited in S3. When the judge processing of all image files is completed in S2, the routine is advanced to S4. In S4, only the valid image files are sorted by the respective folders and file names to be stored in the memory 9. In S5, the main processing unit 10 successively reads the extensions of the valid image files in the memory 9 to judge whether they are a still image file or a moving image file. In S6, a moving image number (hereinafter, called a "file number") is successively matched with any moving image file and a file name and a file number corresponding to the file are matched with each other to be stored in the memory 9. Any still image file in S5 is subjected to the same processing in S7. In S8, completion of judgment whether all valid image files are a moving image file or a still image file is checked. In the case of No, the routine is returned to S5 and the moving image and still image judge processing is continued. In the case of Yes (hereinafter, abbreviated as "Y") in S8, the moving image and still image judge processing is ended and the routine is advanced to S20 of FIG. 3. When judgment of all valid image files is completed in S8, the group of the still image files and the group of the moving image files are successively classified and registered in the memory 9.

In S20 of FIG. 3, whether the mode of the index screen selected by user operation is the still image index screen or the moving image index screen is checked. Typically, in initial setting, the still image index screen mode is set. In this case, the later-described switch button provided on the remote controller is depressed to switch the still image index screen mode to the moving image index screen mode.

When the still image index screen display mode is set in S20, the routine is advanced to S21. The main processing unit 10 sets the number of thumbnails for one index screen to the index screen in S21. Here, the number of thumbnails displayed on the index screen is 16. For simplifying the description, the number of files is 16 or below. In S22, the still image file numbers corresponding to the thumbnail images displayed on the index screen are successively specified to create the thumbnail images by the image decode processing unit 6. The thumbnail images are sequentially stored in the memory 9. In S23, whether thumbnails for the index screen are created is judged. In the case of N in S23, the routine is returned to S22. In the case of Y, the thumbnails for the index screen is judged to be created and the routine is advanced to S42. In S42, the main processing unit 10 supplies the thumbnail images stored in the memory 9 to the image decode processing unit 6 and displays a still image index screen 101 as shown in FIG. 5 on the video display unit 23 via the video/audio outputting unit 7, the input selector switch 21, and the video processing unit 22. The main processing unit 10 instructs the OSD addition unit 8 to superimpose a still image icon 102 on the still image index screen 101. The OSD addition unit 8 superimposes the still image icon 102 on the still image index screen 101 by the video/audio outputting unit 7.

When the moving image index screen mode is set in S20, the routine is advanced to S31. In S31, the main processing unit 10 sets the number of thumbnails for one index screen to the index screen. Here, the number of thumbnails displayed on the index screen is 16. For simplifying the description, the number of files is 16 or below. The moving image file number corresponding to each thumbnail image displayed on the index screen is specified and the main processing unit 10 judges whether the stream of the image file can be decoded (S32). In S32, when it cannot be decoded, "undecodable"

information (status information) is matched with the image file number to be stored in the memory 9 and the routine is advanced to S40. In S32, when it can be decoded, the main processing unit 10 analyzes an audio stream (S33).

In S35, the presence or absence of an audio stream is judged. When the corresponding image file has no audio stream in S35, the routine is advanced to S36, status information of "absence of audio" is matched with the image file number to be stored in the memory 9, and the routine is advanced to S40. When the corresponding image file has an audio stream in S35, in S37, the main processing unit 10 checks whether the audio stream can be decoded. When it can be decoded in S37, in S39, status information of "audio matched" is matched with the image file number to be stored in the memory 9. When it cannot be decoded, in S38, status information of "audio unmatched" is matched with the image file number to be stored in the memory 9. In either case, the routine is advanced to S40. In S40, the corresponding moving image file number is specified to create a thumbnail image by the image decode processing unit 6 to be stored in the memory 9.

In S41, whether thumbnails for the index screen are created is judged. In the case of N in S41, the routine is returned to S32. In the case of Y, thumbnails for the index screen are judged to be created and the routine is advanced to S42. In S42, the main processing unit 10 supplies the thumbnail images stored in the memory 9 to the image decode processing unit 6 and displays a moving image index screen 201 as shown in FIG. 6 on the video display unit 23 via the video/audio outputting unit 7, the input selector switch 21, and the video processing unit 22. The main processing unit 10 instructs the OSD addition unit 8 to superimpose a moving image icon 202 on the moving image index screen 201. The OSD addition unit 8 superimposes the moving image icon 202 on the moving image index screen 201 by the video/audio outputting unit 7. The main processing unit 10 superimposes the status information corresponding to the image file number stored in the memory 9 on the corresponding thumbnail image. The main processing unit 10 instructs the OSD addition unit 8 to superimpose icons corresponding to the status information on the thumbnail images, e.g., an icon 208 of "audio unmatched", an icon 209 of "absence of audio", and an icon 210 of "undecodable". The OSD addition unit 8 matches the icons with the thumbnail images to be superimposed in the video processing unit 22.

In this embodiment, a common icon, such as the still image icon 102 and the moving image icon 202, not depending on a target place (for instance, the video reproducing device 1 is intended for Japan or the United States) is superimposed by a video/audio outputting device 7. An icon which can be changed for each target place is superimposed by the video processing unit 22. This increases the efficiency of development. Character display, not icon display, is superimposed by the video processing unit 22.

In this embodiment, audio analyzing can be made only when a video can be decoded. This embodiment is not limited to this. Audio analyzing may be made when a video cannot be decoded and, when it is judged that the video has audio and can be decoded, only the audio may be reproduced. This can be easily realized by slightly modifying the flow of FIG. 3.

In this embodiment, all the created thumbnails are displayed. This embodiment is not limited to this. A step of optionally setting a file number to be displayed on the index screen may be provided before S42 of FIG. 3 to specify a thumbnail display order or display only any desired thumbnail.

By the above-described processing, the video display unit 23 displays the still image index screen 101 as the first index screen as shown in FIG. 5 or the moving image index screen 201 as the second index screen as shown in FIG. 6. The user operates the direction buttons (described later) of the remote controller based on the index screen to point the cursor to a desired thumbnail image for selecting it and then operates the decide button (described later). Along with this, the selected thumbnail image is read from the memory card 3 to be decoded by the image decode processing unit 6 and is then displayed on the video display unit 23 via the video/audio outputting unit 7, the input selector switch 21, and the video processing unit 22.

As described above, in the video reproducing device according to this embodiment, the user can clearly discriminate an unassumed file, a video-undecodable file, a file without an audio stream, a video-decodable and audio-undecodable file by icon information (or character information) superimposed corresponding to each thumbnail image of the index screen. When it is matched with any one of the video and audio formats of the moving image file, the matched video or audio format can be reproduced.

Embodiment 2

Embodiment 2 of the present invention will be described using FIG. 7.

As in the block schematic configuration of FIG. 1, a related art video reproducing device typically has a TV broadcast reception function and plural external inputs such as VCRs in addition to the recording medium reproducing function and switches recording medium reproduction, reception reproduction, and external input video reproduction based on user operation. For convenience of the description, the switch between the reproductions will be called "input switch" according to usage.

FIG. 7 is a diagram of assistance in explaining an input switch method related to a recording medium according to Embodiment 2. In FIG. 7, elements having common functions to FIGS. 5 and 6 are indicated by the same reference numerals and the overlapped description is omitted.

In FIG. 7, an input switch button 31 provided on the remote controller 30 is a button switching an output of the tuner unit 13 and external inputs from the external input terminals 12. Each time the main processing unit 10 receives operation of the input switch button 31 via the infrared reception unit 20 (that is, in accordance with depression of the input switch button), the plural inputs are cyclically switched.

A recording medium switch button 37 as a switch operation unit is a button cyclically switching for each depression the still image index screen 101 and the moving image index screen 201 based on an image file in the recording medium assumed to be currently connected, and an input screen 301 selected by the input switch button 31 (hereinafter, called a "last channel screen") in such a manner that the still image index screen 101→the moving image index screen 201→the last channel screen 301→the still image index screen 101. The switch button 37 is continuously operated to sequentially switch, as displayed screens, the still image index screen 101, the moving image index screen 201, and the last channel screen 301.

A left direction button 32, a right direction button 33, an up direction button 34, and a down direction button 35 are buttons moving in left, right, up, and down directions a cursor box (not shown) indicating the currently selected one of thumbnail images listed on the index screen. The direction buttons are operated to select the desired thumbnail image. A decide button 36 decides the thumbnail image in the cursor box selected by the direction buttons 32 to 35. Operation of the decide button 36 reproduces the image file corresponding to the thumbnail image selected by the direction buttons.

A channel button 38 is a button performing channel selection of the tuner unit 13 and is also a button which can directly select a thumbnail image of the displayed index screen. As described in Embodiment 1, an image file corresponding to a thumbnail image is given a number by the rule set by the video reproducing device. The number (file number) functions as an identification number for identifying plural thumbnail images (and the corresponding image files). As shown in the index screens 101 and 201 of FIG. 7, the file number as an identification number is displayed in the thumbnail image. In FIG. 7, for simplifying the displaying, it is displayed by a numeral in large size across the outside of the thumbnail image range. Actually, the numeral is displayed to be within one thumbnail image. For instance, when the index screen 201 is displayed, the channel button 2 is operated to directly select a thumbnail image 204 in the second position from the upper left corner of the thumbnail listing display.

The moving image file corresponding to the selected thumbnail image 204 (file No. 2) is reproduced. In this embodiment, when the still image index screen and the moving image index screen are displayed, the channel number provided on the remote controller 30 is operated to directly select a desired thumbnail image (that is, image file). That is, when the channel button on the remote controller 30 is operated, a thumbnail image having a file number (identification number) corresponding to a numeral inputted by the channel button can be selected. Typically, when the channel button on the remote controller 30 is pressed, the channel of the channel number is selected. In this embodiment, while the still image index screen and the moving image index screen are displayed, the channel selection operation is prohibited. While the still image index screen and the moving image index screen are displayed, channel selection cannot be done by the channel button.

A return button 39 is a button cyclically switching the index screens in the reverse direction of the recording medium switch button 37. When the moving image index screen 201 is displayed and the return button 39 is operated, the still image index screen 101 is displayed.

The video reproducing device according to this embodiment functions as described above by depressing the button provided on the remote controller 30.

As shown in FIG. 7, in the recording medium input switch, each time the recording medium switch button 37 is depressed, the still image index screen 101, the moving image index screen 201, and the last channel screen 301 are cyclically switched in a predetermined direction. There is no selection operation on the menu screen. The recording medium switch button 37 is depressed for immediate switch to the recording medium index screen. The index screens including the last channel screen is cyclically switched. The status (last channel screen) before being switched to the recording medium can be easily returned by one input switch button without depressing it many times.

An image file corresponding to a thumbnail image can be directly selected by the channel button 38 using file numbering. The operation becomes easy.

Embodiment 3

Embodiment 3 according to the present invention will be described using FIGS. 8A to 10C.

Figure 8A:
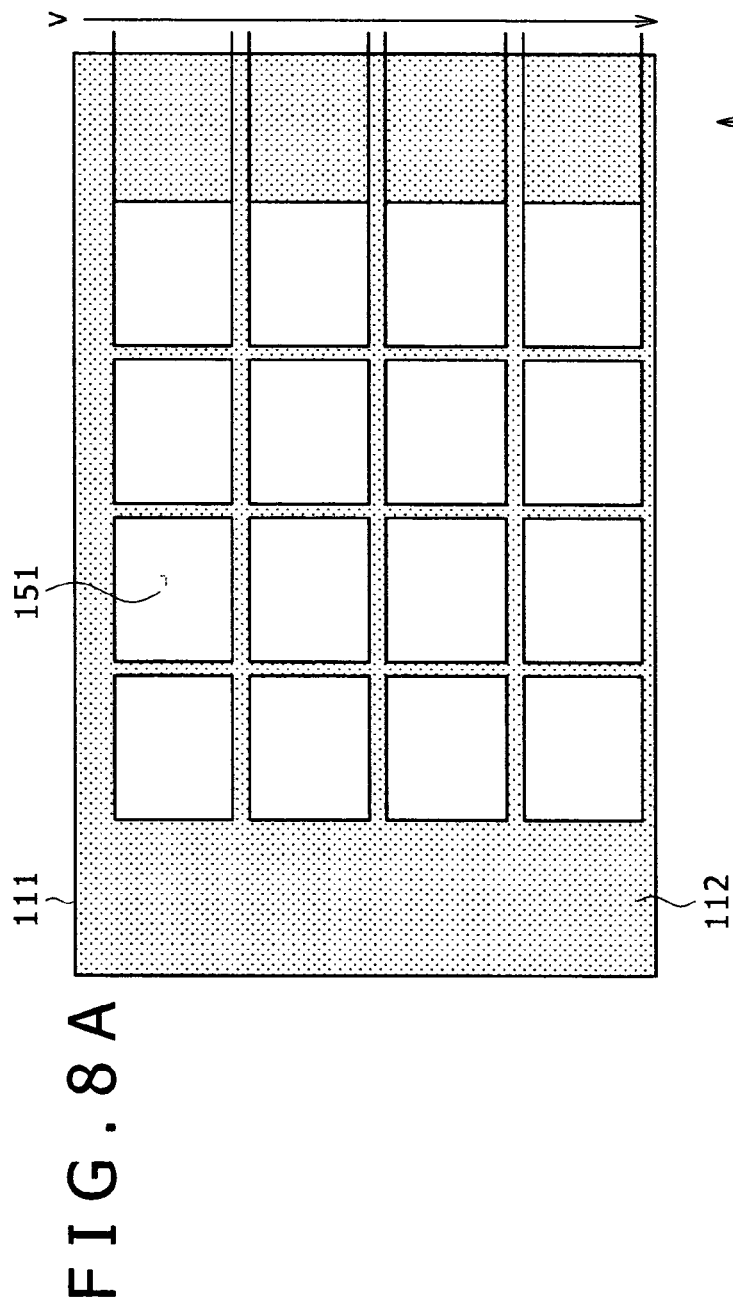
FIGS. 8A and 8B are diagrams showing an index screen and change in brightness of a screen vertical direction in the related art.
Figure 8B:
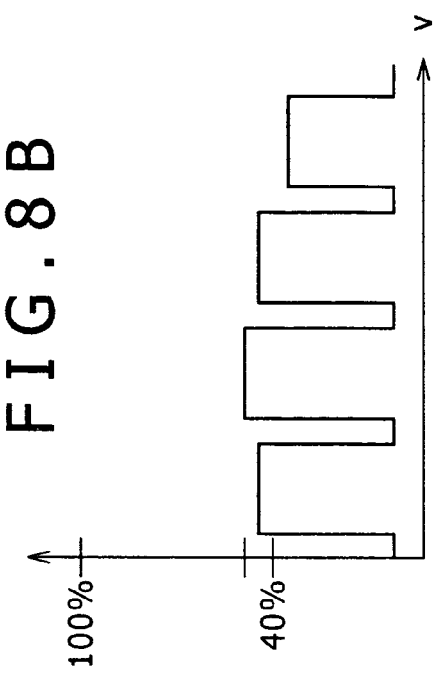

FIGS. 8A and 8B are diagrams showing an index screen and changes in brightness in a screen vertical direction in the related art. FIG. 9 is a diagram of how the index screen is viewed in the related art. FIGS. 10A to 10C are diagrams showing an index screen and changes in brightness in a screen vertical direction according to Embodiment 3.

As shown in FIG. 8A, in the related art, an index screen 111 often displays thumbnail images 151 on a background screen 112 of a single color such as gray or blue. The average brightness level of the thumbnail images 151 is typically about 40%. Changes in brightness in the screen vertical direction in that case is shown in FIG. 8B. As shown in FIG. 8B, the brightness level difference in the screen vertical (hereinafter, abbreviated as "V") direction is large in the gray back portion of the background screen 112 and the thumbnail image 151 portions.

In such case, when a PDP (Plasma Display Panel) or CRT (Cathode Ray Tube) is used as a display device of the video display unit 23, the brightness difference in the vertical direction is caused by the streaking characteristic of the panel. As shown in FIG. 9, not FIG. 8A, in viewing on the video display unit 23, the brightness of H lines in portions with the thumbnail images 151 is reduced so that H lines in portions without the thumbnail images 151 are displayed as streaks 115 brighter than H lines in portions with thumbnail images 151. In the related art, the brightness level of the background screen 112 of the index screen 111 is lowered extremely for making washed-out-brightness level less noticeable. Only an index screen limited in design can be provided to the user.

In view of such circumstances, the thumbnail of a single color having an average brightness level of 40% is displayed on the index screen and experimented on an actual device. When the brightness level of the background screen is 48% or above, the streaks are significantly noticeable.

The level difference is varied depending on display devices. In consideration of margin, in this embodiment, change in brightness of the background screen to the average brightness of the thumbnail images in the index screen V direction is within e.g., 10% to the average brightness of the thumbnail images.

As shown in FIG. 10c, the brightness level of a background screen 122 of the index screen 121 shown in FIG. 10A is within ±10% with reference to 40% as the average brightness level of the thumbnail images 151. The brightness level difference between the background screen and the thumbnail image is reduced to suppress washed-out-brightness level.

The brightness level difference is eliminated. As shown in FIG. 10B, the background screen 122 is designed so that horizontal lines finer than the pitch between the thumbnail images show a clear contrast between light and shade. Washed-out-brightness can be less noticeable. Along with this, the design limit can be significantly improved than the background screen of a single color.

The background screen 122 is designed so that horizontal lines finer than the pitch between the thumbnail images show a clear contrast between light and shade. Just by doing this, when the difference between the brightness level of the background screen 122 and the average brightness level of the thumbnail images 151 is large, the bright streaks 115 shown in FIG. 9 can be less noticeable.

What is claimed is:
1. A video reproducing device comprising:
 an interface unit configured to be connectable to a recording medium to be input a still image file and/or a moving image file recorded in the recording medium; and a processing unit which reproduces the still image file and/or the moving image file input to the interface unit to display on a display unit, wherein the processing unit can generate a first index screen showing a listing of a plurality of thumbnail images corresponding to the still image files and a second index screen showing a listing of a plurality of thumbnail images corresponding to the moving image files and can display them on the display unit, and a background image of the first or second index screen includes a horizontal stripe pattern narrower than a pitch between the thumbnail images in a vertical direction.

2. The video reproducing device according to claim 1, wherein an average brightness level of the background image including the horizontal stripe pattern is controlled in accordance with an average brightness level of the thumbnail images displayed on the first or second index screen.

3. The video reproducing device according to claim 2, wherein the average brightness level of the background image including the horizontal stripe pattern is controlled to be ±10% or below of the average brightness level of the thumbnail images.

4. A video reproducing device comprising:

an interface unit configured to be connectable to a recording medium to be input a still image file and/or a moving image file recorded in the recording medium; and a processing unit which reproduces the still image file and/or the moving image file input to the interface unit to display on a display unit, wherein the processing unit can generate a first index screen showing a listing of a plurality of thumbnail images corresponding to the still image files and a second index screen showing a listing of a plurality of thumbnail images corresponding to the moving image files and can display them on the display unit, and a background image of the first or second index screen includes, between thumbnail images adjacent to each other in a vertical direction, a horizontal stripe pattern including a plurality of horizontal stripes which are each narrower vertically than a pitch between the thumbnail images in a vertical direction.

5. The video reproducing device according to claim 4, wherein an average brightness level of the background image including the horizontal stripe pattern is controlled in accordance with an average brightness level of the thumbnail images displayed on the first or second index screen.

6. The video reproducing device according to claim 5, wherein the average brightness level of the background image including the horizontal stripe pattern is controlled to be ±10% or below of the average brightness level of the thumbnail images.

7. A video reproducing device comprising:

an interface unit configured to be connectable to a recording medium to be input a still image file and/or a moving image file recorded in the recording medium; and a processing unit which reproduces the still image file and/or the moving image file input to the interface unit to display on a display unit, wherein the processing unit can generate a first index screen showing a listing of a plurality of thumbnail images corresponding to the still image files and a second index screen showing a listing of a plurality of thumbnail images corresponding to the moving image files and can display them on the display unit, and a background image of the first or second index screen includes, between thumbnail images adjacent to each other in a vertical direction, a horizontal stripe pattern including a plurality of horizontal stripes which are each narrower vertically than a pitch between the thumbnail images in a vertical direction, where the horizontal stripe pattern includes at least one horizontal stripe which is wider vertically than another horizontal stripe of the horizontal stripe pattern.

8. The video reproducing device according to claim 7, wherein an average brightness level of the background image including the horizontal stripe pattern is controlled in accordance with an average brightness level of the thumbnail images displayed on the first or second index screen.

9. The video reproducing device according to claim 8, wherein the average brightness level of the background image including the horizontal stripe pattern is controlled to be ±10% or below of the average brightness level of the thumbnail images.

* * * * *